(12) United States Patent
Sanjar et al.

(10) Patent No.: US 7,496,888 B2
(45) Date of Patent: Feb. 24, 2009

(54) SOLUTION BUILDER WIZARD

(75) Inventors: Amir Farrokh Sanjar, Austin, TX (US); Cristi Nesbitt Ullmann, Austin, TX (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 11/101,604

(22) Filed: Apr. 7, 2005

(65) Prior Publication Data
US 2006/0228654 A1    Oct. 12, 2006

(51) Int. Cl.
*G06F 9/44* (2006.01)

(52) U.S. Cl. .............. 717/105; 717/100; 717/101; 717/107; 717/109

(58) Field of Classification Search ......... 717/100–109, 717/113
See application file for complete search history.

(56) References Cited

U.S. PATENT DOCUMENTS

| | | | | |
|---|---|---|---|---|
| 4,813,013 | A * | 3/1989 | Dunn | 715/763 |
| 5,377,318 | A * | 12/1994 | Wolber | 715/809 |
| 5,394,522 | A * | 2/1995 | Sanchez-Frank et al. | 715/735 |
| 5,555,370 | A * | 9/1996 | Li et al. | 715/763 |
| 5,572,648 | A * | 11/1996 | Bibayan | 715/825 |
| 5,632,022 | A * | 5/1997 | Warren et al. | 715/776 |
| 5,848,393 | A | 12/1998 | Goodridge | |
| 5,913,065 | A * | 6/1999 | Faustini | 717/107 |
| 6,208,345 | B1 * | 3/2001 | Sheard et al. | 715/853 |
| 6,259,448 | B1 * | 7/2001 | McNally et al. | 715/733 |
| 6,272,672 | B1 | 8/2001 | Conway | |
| 6,334,211 | B1 * | 12/2001 | Kojima et al. | 717/128 |
| 6,393,557 | B1 * | 5/2002 | Guthridge et al. | 713/1 |
| 6,405,364 | B1 | 6/2002 | Bowman-Amuah | |
| 6,427,132 | B1 | 7/2002 | Bowman-Amuah | |
| 6,446,200 | B1 | 9/2002 | Ball et al. | |
| 6,591,244 | B2 | 7/2003 | Jim et al. | 705/9 |
| 6,601,233 | B1 | 7/2003 | Underwood | |
| 6,725,249 | B2 | 4/2004 | Sidi et al. | |
| 6,738,964 | B1 | 5/2004 | Zink et al. | 717/105 |

(Continued)

OTHER PUBLICATIONS

Wreder, K, Deng, Yi.. "Architecture-centered enterprise system development and integration based on distributed object technology standard." Computer Software and Applications Conference (1999): 250-258.*

(Continued)

*Primary Examiner*—Wei Y Zhen
*Assistant Examiner*—Matthew J Brophy
(74) *Attorney, Agent, or Firm*—Robert H. Frantz; Diana R. Gerhardt; Herman Rodriguez

(57) ABSTRACT

A palette is displayed containing icons representing available system components for use in a solution. Associated with the icons are partially defined behavioral models, implementation logic, and user-modifiable parameters and options in a markup language format. Instances of the configurable behavioral models are instantiated through selection by a user. A design area of the display shows icons for the instances, where they are placed and arranged by the user, including connection logic and user-input model interface and behavioral logic parameters. The models are configured according to the parameters by modifying the associated markup language. A system solution behavioral model is automatically created in a modeling language comprising a collection of the interconnected and fully defined component behavioral model instances, allowing simulation of operation of the system solution.

13 Claims, 21 Drawing Sheets

U.S. PATENT DOCUMENTS

| | | | |
|---|---|---|---|
| 6,879,685 B1 | 4/2005 | Peterson et al. | |
| 6,882,723 B1 | 4/2005 | Peterson et al. | |
| 6,937,705 B1 | 8/2005 | Godfrey et al. | |
| 6,937,993 B1 | 8/2005 | Gabbita et al. | |
| 6,966,039 B1 * | 11/2005 | Bartz et al. | 716/1 |
| 7,065,637 B1 * | 6/2006 | Nanja | 713/1 |
| 7,082,521 B1 * | 7/2006 | Nanja | 713/1 |
| 7,103,562 B2 | 9/2006 | Kosiba et al. | |
| 7,139,999 B2 | 11/2006 | Bowman-Amuah | |
| 7,313,534 B2 | 12/2007 | Sheer | |
| 7,356,482 B2 | 4/2008 | Frankland et al. | |
| 2002/0073094 A1 | 6/2002 | Becker et al. | 707/102 |
| 2002/0091990 A1 * | 7/2002 | Little et al. | 717/105 |
| 2003/0222906 A1 * | 12/2003 | Fish et al. | 345/744 |
| 2004/0044514 A1 | 3/2004 | Granny et al. | 703/23 |
| 2004/0107414 A1 | 6/2004 | Bronicki et al. | 717/105 |
| 2004/0143810 A1 | 7/2004 | Ahmed et al. | 717/100 |
| 2004/0181771 A1 * | 9/2004 | Anonsen et al. | 717/100 |
| 2004/0260715 A1 * | 12/2004 | Mongeon et al. | 707/101 |

OTHER PUBLICATIONS

Quatrani, Terry; "Visual Modeling with Rational Rose and UML", Dec. 18, 1997, Chapters 1-12.

Template Software Inc. (Dulles, VA), "Using the WFT Development Environment", copyright 1998.

Template Software Inc. (Dulles, VA), "Developing a WFT Workflow System", copyright 1998.

* cited by examiner

Example UML Model in XML for a Database Component

```
<?xml version="1.0" encoding="UTF-8"?>
<!DOCTYPE itemDefinition SYSTEM "itemDefinition.dtd" >
<itemDefinition>
 <productName>DB2 UDB Enterprise Edition 8.1.2</productName>
 <item itemDelimiter="" itemState="M" itemType="STANZA">
   <itemDescription>Description</itemDescription>
   <itemValue>Value/Choice</itemValue>
   <itemName>Installation Parameter Name</itemName>
   <item itemDelimator="," itemState="M" itemType="CHOICE">
      <itemDescription>Product type to be installed.
   Only one can be selected.
   </itemDescription>
      <itemValue>ENTERPRISE_SERVER_EDITION</itemValue>
   <itemValues>
   ENTERPRISE_SERVER_EDITION,
   APPLICATION_DEVELOPMENT_CLIENT,
   CONNECT_PERSONAL_EDITION,
   CONNECT_ENTERPRISE_EDITION, DATA_LINKS_MANAGER,
   DB2_HTML_DOCUMENTATION,ADMINISTRATION_CLIENT,
   LIFE_SCIENCES_DATA_CONNECT,PERSONAL_EDITION,
   RELATIONAL_CONNECT,RUNTIME_CLIENT,
   SPATIAL_EXTENDER, WAREHOUSE_MANAGER,WAREHOUSE_MANAGER_CONNECTORS,
   WORKGROUP_SERVER_EDITION
    </itemValues>
      <itemName>PROD</itemName>
  </item>
</itemDefinition>
```

Figure 10

Example Item Description DTD

```
<?xml version="1.0" encoding="UTF-8"?>
<!ELEMENT itemDefinition (productName, item+)>
<!ELEMENT productName (#PCDATA)>
<!ELEMENT item
(itemDescription, itemValue, itemValues?,
itemName,item*)
>
<!ELEMENT itemDescription (#PCDATA)>
<!ELEMENT itemValue (#PCDATA)>
<!ELEMENT itemValues (#PCDATA)>
<!ELEMENT itemName (#PCDATA)>
<!ATTLIST item
itemType CDATA #REQUIRED
itemState CDATA #REQUIRED
itemDelimator CDATA #REQUIRED
>
```

Figure 11

Example MQ Version 5.3 Description in XML

```xml
<?xml version="1.0" encoding="UTF-8"?>
<!DOCTYPE itemDefinition SYSTEM "itemDefinition.dtd" >
<itesmDefinition>
 <productName>Websphere MQ 5.3</productName>
 <item itemDelimator="" itemState="M" itemType="STANZA">
   <itemDescription>Description</itemDescription>
   <itemValue>Value/Choice</itemValue>
   <itemName>Response</itemName>
   <item itemState="O" itemType="TEXT" itemDelimator="">
     <itemDescription>'Folder for the WebSphere MQ program files. For
       example,c:\mqm.</itemDescription>
     <itemValue>"C:\Program Files\IBM\Websphere MQ"</itemValue>
     <itemName>PGMFOLDER</itemName>
   </item>
   <item itemState="O" itemType="TEXT" itemDelimator="">
     <itemDescription>Folder for the WebSphere MQ data files. For example,
       c:\mqm\data.</itemDescription>
     <itemValue>"C:\Program Files\IBM\Websphere MQ\Data"</itemValue>
     <itemName>DATFOLDER</itemName>
   </item>
   <item itemState="O" itemType="TEXT" itemDelimator="">
     <itemDescription>Folder for the WebSphere MQ queue manager log files.
       For example, c:\mqm\log.</itemDescription>
     <itemValue>"C:\Program Files\IBM\Websphere MQ\Log"</itemValue>
     <itemName>LOGFOLDER</itemName>
   </item>
   <item itemState="M" itemType="CHOICE" itemDelimator=",">
     <itemDescription>Accept the terms of the license. For a silent installation,
       this must be set to yes.</itemDescription>
     <itemValue>Yes</itemValue>
     <itemValues>Yes,No</itemValues>
     <itemName>AGREETOLICENSE</itemName>
   </item>
   <item itemState="O" itemType="CHOICE" itemDelimator=",">
     <itemDescription>If the Server feature is to be uninstalled, whether to
       delete any existing queue managers. delete removes any existing
       queue managers. keep, or any other value, keeps
       them</itemDescription>
     <itemValue>Keep</itemValue>
     <itemValues>Keep,Delete</itemValues>
     <itemName>KEEPQMDATA</itemName>
   </item>
   <item itemState="O" itemType="CHOICE" itemDelimator=",">
     <itemDescription>If the WebAdmin feature is already installed from a
       previous version of MQSeries, it will be uninstalled. This property
       gives you the option to delete the existing Web Administration
       scripts. delete removes any existing Web Administration scripts.
       keep, or any other value, keeps them</itemDescription>
     <itemValue>Keep</itemValue>
     <itemValues>Keep,Delete</itemValues>
     <itemName>KEEPWEBDATA</itemName>
   </item>
```

Figure 12a

Example MQ Version 5.3 Description in XML (continued)

```xml
<item itemState="0" itemType="MULTI_CHOICE" itemDelimator=",">
    <itemDescription>List of features to install locally. All installs all features
        Default installs the typical features. If you do not want a feature use
        REMOVE=feature. The valid features are listed in the table
        below</itemDescription>
    <itemValue>ALL</itemValue>
    <itemValues>ALL,Server,GuiAdmin,Client,JavaMsg,Toolkit</itemValues>
    <itemName>ADDLOCAL</itemName>
</item>
<item itemState="0" itemType="CHOICE" itemDelimator=",">
    <itemDescription>Start the WebSphere MQ Service at the end of
        installation.</itemDescription>
    <itemValue>Yes</itemValue>
    <itemValues>Yes,No</itemValues>
    <itemName>STARTSERVICE</itemName>
</item>
<item itemState="0" itemType="CHOICE" itemDelimator=",">
    <itemDescription>Start the WebSphere MQ taskbar application at the end
        of installation. . (The default) Start the WebSphere MQ taskbar
        application at the end of installation if it was running at the start, or
        if this is a new installation. Anything else. Start the taskbar
        application at the end of the installation. Ignored if the server
        feature is not installed.</itemDescription>
    <itemValue>Yes</itemValue>
    <itemValues>Yes,No</itemValues>
    <itemName>STARTTASKBAR</itemName>
</item>
</item>
<item itemState="0" itemType="STANZA" itemDelimator="">
    <itemDescription>Contains general properties related to how the MQParms
        command runs and to the installation of WebSphere MQ. Valid values are
        listed in "MSI Stanza" table</itemDescription>
    <itemValue>Value/Choice</itemValue>
    <itemName>MSI</itemName>
    <item itemState="0" itemType="CHOICE" itemDelimator=",">
        <itemDescription>system. Install using the language of the default system
            locale (the default).\nuser. Install using the language of the default locale of
            the user.</itemDescription>
        <itemValue>system</itemValue>
        <itemValues>system,user</itemValues>
        <itemName>MQPLANGUAGE</itemName>
    </item>
    <item itemState="0" itemType="TEXT" itemDelimator=",">
        <itemDescription>MQParms generates a text log file with the specified
            name and location.</itemDescription>
        <itemValue>path\file_name</itemValue>
        <itemName>MQPLOG</itemName>
    </item>
</item>
<item itemDelimator="" itemState="0" itemType="STANZA">
    <itemDescription>Description</itemDescription>
    <itemValue>Values</itemValue>
    <itemName>Services Stanza</itemName>
    <item itemDelimator="," itemState="0" itemType="CHOICE">
        <itemDescription>The type of user account to use. local. Creates a local
            user account. domain. Uses the domain user account specified by
            DOMAINNAME, USERNAME, and PASSWORD. Do not use
            double quotes</itemDescription>
        <itemValue>local</itemValue>
        <itemValues>local,domain</itemValues>
        <itemName>USERTYPE</itemName>
    </item>
</item>

</itemDefinition>
```

Figure 12b

Example WAS Version 5.1 Description in XML

```xml
<?xml version="1.0" encoding="UTF-8"?>
<!DOCTYPE itemDefinition SYSTEM "itemDefinition.dtd" >
<itemDefinition>
   <productName>WebSphere Application Server 5.1</productName>
   <item itemDelimator="" itemState="M" itemType="STANZA">
     <itemDescription>Description</itemDescription>
     <itemValue>Value/Choice</itemValue>
     <itemName>Parameter Name</itemName>
     <item itemDelimator="," itemState="M" itemType="CHOICE">
       <itemDescription>Custom installation, or full installation</itemDescription>
       <itemValue>custom</itemValue>
       <itemValues>custom,full</itemValues>
       <itemName>-W setupTypes.selectedSetupTypeId</itemName>
     </item>
     <item itemDelimator="," itemState="O" itemType="CHOICE">
     <itemDescription>Silent install</itemDescription>
     <itemValue>silent</itemValue>
     <itemValues>silent,not-silent</itemValues>
     <itemName>-silent</itemName>
     </item>
     <item itemDelimator="" itemState="O" itemType="TEXT">
     <itemDescription>Install location for WAS.  </itemDescription>
     <itemValue>"C:\Program Files\WebSphere\AppServer"</itemValue>
     <itemName>-P wasBean.installLocation</itemName>
     </item>
     <item itemDelimator="" itemState="O" itemType="TEXT">
     <itemDescription>This value is required if you choose to install IBM HTTP Server(IHS).
If the location has a previous IHS installed, please delete all contents in the
corresponding folder.  Uninstall the previous IHS is not
sufficient.</itemDescription>
     <itemValue>"C:\Program Files\IBMHTTPServer"</itemValue>
     <itemName>-P ihsFeatureBean.installLocation</itemName>
     </item>
     <item itemDelimator="," itemState="O" itemType="CHOICE">
     <itemDescription>To install the application server.</itemDescription>
     <itemValue>true</itemValue>
     <itemValues>true,false</itemValues>
     <itemName>-P serverBean.active</itemName>
     </item>
     <item itemDelimator="," itemState="O" itemType="CHOICE">
     <itemDescription>To install the amininstration features.</itemDescription>
     <itemValue>true</itemValue>
     <itemValues>true,false</itemValues>
     <itemName>-P adminBean.active</itemName>
     </item>
     <item itemDelimator="" itemState="O" itemType="CHOICE">
     <itemDescription>To install Scripting Administration features.</itemDescription>
     <itemValue>true</itemValue>
     <itemValues>true,false</itemValues>
     <itemName>-P adminScriptingFeatureBean.active</itemName>
     </item>
     <item itemDelimator="," itemState="O" itemType="CHOICE">
     <itemDescription>To install Administrative Console.</itemDescription>
     <itemValue>true</itemValue>
     <itemValues>true,false</itemValues>
     <itemName>-P adminConsoleFeatureBean.active</itemName>
     </item>
     <item itemDelimator="," itemState="O" itemType="CHOICE">
     <itemDescription>To install application Assembly and Deployment
```

Figure 13a

Example WAS Version 5.1 Description in XML (cont.)

```
tools.</itemDescription>
    <itemValue>true</itemValue>
    <itemValues>true,false</itemValues>
    <itemName>-P applicationAndAssemblyToolsBean.active </itemName>
    </item>
    <item itemDelimator="," itemState="0" itemType="CHOICE">
    <itemDescription>To install Deploy tools.</itemDescription>
    <itemValue>true</itemValue>
    <itemValues>true,false</itemValues>
    <itemName>-P deployToolBean.active</itemName>
    </item>
    <item itemDelimator="," itemState="0" itemType="CHOICE">
    <itemDescription>To install Ant Utilities</itemDescription>
    <itemValue>true</itemValue>
    <itemValues>true,false</itemValues>
    <itemName>-P antUtilityBean.active</itemName>
    </item>
    <item itemDelimator="," itemState="0" itemType="CHOICE">
    <itemDescription>To install Embedded Messaging</itemDescription>
    <itemValue>true</itemValue>
    <itemValues>true,false</itemValues>
    <itemName>-P mqSeriesBean.active</itemName>
    </item>
    <item itemDelimator="," itemState="0" itemType="CHOICE">
    <itemDescription>To install Embedded Messaging Server and Client.</itemDescription>
    <itemValue>true</itemValue>
    <itemValues>true,false</itemValues>
    <itemName>-P mqSeriesServerBean.active</itemName>
    </item>
    <item itemDelimator="" itemState="0" itemType="TEXT">
    <itemDescription>Install location for Embedded Messaging Server and
Client.</itemDescription>
    <itemValue>"C:\Program Files\IBM\WebSphereMQ"</itemValue>
    <itemName>-P mqSeriesServerBean.installLocation</itemName>
    </item>
    <item itemDelimator="," itemState="0" itemType="CHOICE">
    <itemDescription>To install Embedded Messaging Client only. Only one of installing
Embedded Messageing of Server and Client, or installing Embedded Messaging of
Client can be chosen.</itemDescription>
    <itemValue>false</itemValue>
    <itemValues>false,true</itemValues>
    <itemName>-P mqSeriesClientBean.active</itemName>
    </item>
    <item itemDelimator="" itemState="0" itemType="TEXT">
    <itemDescription>Install location for Embedded Messaging Client.</itemDescription>
    <itemValue>"C:\Program Files\IBM\WebSphereMQ"</itemValue>
    <itemName>-P mqSeriesClientBean.installLocation</itemName>
    </item>
    <item itemDelimator="," itemState="0" itemType="CHOICE">
    <itemDescription>To install Message-Driven bean samples.</itemDescription>
    <itemValue>true</itemValue>
    <itemValues>true,false</itemValues>
    <itemName>-P mqSeriesSamplesBean.active</itemName>
    </item>
    <item itemDelimator="," itemState="0" itemType="CHOICE">
    <itemDescription>To install IHS Web Server 1.3.28.</itemDescription>
    <itemValue>true</itemValue>
    <itemValues>true,false</itemValues>
    <itemName>-P ihsFeatureBean.active</itemName>
    </item>
```

Figure 13b

Example WAS Version 5.1 Description in XML (cont.)

```xml
<item itemDelimator="," itemState="0" itemType="CHOICE">
<itemDescription>To install Web Server Plugins.</itemDescription>
<itemValue>true</itemValue>
<itemValues>true,false</itemValues>
<itemName>-p pluginBean.active </itemName>
</item>
<item itemDelimator="," itemState="0" itemType="CHOICE">
<itemDescription>To install IBM HTTP Server V1.3 Plugin.</itemDescription>
<itemValue>true</itemValue>
<itemValues>true,false</itemValues>
<itemName>-P ihsPluginBean.active</itemName>
</item>
<item itemDelimator="," itemState="0" itemType="CHOICE">
<itemDescription>To install IBM HTTP Server V2.0 Plugin.</itemDescription>
<itemValue>false</itemValue>
<itemValues>false,true</itemValues>
<itemName>-P ihs20PluginBean.active</itemName>
</item>
<item itemDelimator="," itemState="0" itemType="CHOICE">
<itemDescription>To install Apache Web Server V1.3 Plugin.</itemDescription>
<itemValue>false</itemValue>
<itemValues>false,true</itemValues>
<itemName>-P apachePluginBean.active </itemName>
</item>
<item itemDelimator="," itemState="0" itemType="CHOICE">
<itemDescription>To install Apache Web Server V2.0 Plugin.</itemDescription>
<itemValue>false</itemValue>
<itemValues>false,true</itemValues>
<itemName>-P apache20PluginBean.active</itemName>
</item>
<item itemDelimator="," itemState="0" itemType="CHOICE">
<itemDescription>To install Microsoft Internet Information Services (IIS)
Plugin.</itemDescription>
<itemValue>false</itemValue>
<itemValues>false,true</itemValues>
<itemName>-P iisPluginBean.active</itemName>
</item>
<item itemDelimator="," itemState="0" itemType="CHOICE">
<itemDescription>To install iPlanet Web Server Plugin.</itemDescription>
<itemValue>false</itemValue>
<itemValues>false,true</itemValues>
<itemName>-P iplanet60PluginBean.active</itemName>
</item>
<item itemDelimator="," itemState="0" itemType="CHOICE">
<itemDescription>To install Domino Web Server Plugin.</itemDescription>
<itemValue>flase</itemValue>
<itemValues>false, true</itemValues>
<itemName>-P dominoPluginBean.active</itemName>
</item>
<item itemDelimator="," itemState="0" itemType="CHOICE">
<itemDescription>To install samples.</itemDescription>
<itemValue>true</itemValue>
<itemValues>true,false</itemValues>
<itemName>-P samplesBean.active </itemName>
</item>
<item itemDelimator="," itemState="0" itemType="CHOICE">
<itemDescription>To install performance and analysis tools.</itemDescription>
<itemValue>true</itemValue>
<itemValues>true,false</itemValues>
<itemName>-P performanceAndAnalysisToolsBean.active</itemName>
</item>
```

Figure 13c

Example WAS Version 5.1 Description in XML (cont.)

```xml
<item itemDelimator="," itemState="0" itemType="CHOICE">
<itemDescription>To install Tivoli Performance Viewer.</itemDescription>
<itemValue>true</itemValue>
<itemValues>true,fallse</itemValues>
<itemName>-P tivoliPerfBean.active</itemName>
</item>
<item itemDelimator="," itemState="0" itemType="CHOICE">
<itemDescription>To install Dynamic Cache Monitor.</itemDescription>
<itemValue>false</itemValue>
<itemValues>true,false</itemValues>
<itemName>-P DCMBean.active</itemName>
</item>
<item itemDelimator="," itemState="0" itemType="CHOICE">
<itemDescription>To install Performance Servlet.</itemDescription>
<itemValue>true</itemValue>
<itemValues>true,false</itemValues>
<itemName>-P performanceServletBean.active</itemName>
</item>
<item itemDelimator="," itemState="0" itemType="CHOICE">
<itemDescription>To install Log Analyzer.</itemDescription>
<itemValue>true</itemValue>
<itemValues>true,false</itemValues>
<itemName>-P logAnalyzerBean.active</itemName>
</item>
<item itemDelimator="," itemState="0" itemType="CHOICE">
<itemDescription>To install Javadocs</itemDescription>
<itemValue>true</itemValue>
<itemValues>true,false</itemValues>
<itemName>-P javadocBean.active</itemName>
</item>
<item itemDelimator="" itemState="0" itemType="TEXT">
<itemDescription>The node name is used for administration, and must be unique within its
group of notes (cell). Replace the "DefaultNode" with your node name. For
migration from previous version, use the same node name as the one in previous
version. </itemDescription>
<itemValue>DefaultNode</itemValue>
<itemName>-W nodeNameBean.nodeName</itemName>
</item>
<item itemDelimator="" itemState="0" itemType="TEXT">
<itemDescription>Enter a resolveable hostname or IP address of your machine.
</itemDescription>
<itemValue>127.0.0.1</itemValue>
<itemName>-W nodeNameBean.hostName</itemName>
</item>
<item itemDelimator="," itemState="0" itemType="CHOICE">
<itemDescription>To install services for IHS and Websphere Application Server on
Windows. Using the services, you can start and stop the services.</itemDescription>
<itemValue>true</itemValue>
<itemValues>true,false</itemValues>
<itemName>-W serviceSettingsWizardBean.active</itemName>
</item>
<item itemDelimator="," itemState="0" itemType="CHOICE">
<itemDescription>To install IHS Services. If it sets to be "true", it requires -W
```

Figure 13d

Example WAS Version 5.1 Description in XML (cont.)

```
serviceSettingWizardBean.active also set to be "true".</itemDescription>
    <itemValue>true</itemValue>
    <itemValues>true,false</itemValues>
    <itemName>-W serviceSettingsWizardBean.ihsChoice</itemName>
    </item>
    <item itemDelimator="," itemState="0" itemType="CHOICE">
    <itemDescription>To install the WebSphere Application Server Service.  If it sets to be
"true", it requires -W serviceSettingWizardBean.active also set to be
"true".</itemDescription>
    <itemValue>true</itemValue>
    <itemValues>true,false</itemValues>
    <itemName>-W serviceSettingsWizardBean.wasChoice</itemName>
    </item>
    <item itemDelimator="" itemState="0" itemType="TEXT">
    <itemDescription>User ID for installing the Services. It is required if  -W
serviceSettingsWizardBean.ihsChoice = "true" or -W
serviceSettingsWizardBean.wasChoice="true". The ID must be an admin, or must
have admin authority to install a Service.  The ID must also have "Log  on as a
Service" authority.</itemDescription>
    <itemValue>installation user ID</itemValue>
    <itemName>-W serviceSettingsWizardBean.userName</itemName>
    </item>
    <item itemDelimator="" itemState="C" itemType="TEXT">
    <itemDescription>It is required if -W serviceSettingsWizardBean.ihsChoice = "true" or -W
serviceSettingsWizardBean.wasChoice="true".  The password much be the same as
the one for the OS., otherwise, the installation will not continue.</itemDescription>
    <itemValue> </itemValue>
    <itemName>-W serviceSettingsWizardBean.password</itemName>
    </item>
    <item itemDelimator="," itemState="0" itemType="CHOICE">
    <itemDescription>To install the launcher icon for start server.</itemDescription>
    <itemValue>true</itemValue>
    <itemValues>true,false</itemValues>
    <itemName>-P StartServerIconBean.active</itemName>
    </item>
    <item itemDelimator="," itemState="0" itemType="CHOICE">
    <itemDescription>To install the launcher icon for stop server.</itemDescription>
    <itemValue>true</itemValue>
    <itemValues>true,false</itemValues>
    <itemName>-P StopServerIconBean.active</itemName>
    </item>
    <item itemDelimator="," itemState="0" itemType="CHOICE">
    <itemDescription>To install the launcher icon for AdminConsole.</itemDescription>
    <itemValue>true</itemValue>
    <itemValues>true,false</itemValues>
    <itemName>-P AdminConsolIconBean.active</itemName>
    </item>
    <item itemDelimator="," itemState="0" itemType="CHOICE">
    <itemDescription>To install the launcher icon for the samples gallery.</itemDescription>
    <itemValue>true</itemValue>
    <itemValues>true,false</itemValues>
    <itemName>-P SamplesGalleryIconBean.active</itemName>
    </item>
    <item itemDelimator="," itemState="0" itemType="CHOICE">
    <itemDescription>To install  the launcher icon for the Tivoli - -
```

Figure 13e

Example WAS Version 5.1 Description in XML (cont.)

```
Performance.</itemDescription>
    <itemValue>true</itemValue>
    <itemValues>true,false</itemValues>
    <itemName>-P TivoliPerfIconBean.active</itemName>
    </item>
    <item itemDelimator="," itemState="O" itemType="CHOICE">
    <itemDescription>To install the launcher icon for the corresponding
component.</itemDescription>
    <itemValue>true</itemValue>
    <itemValues>true,false</itemValues>
    <itemName>-P infoCenterIconBean.active </itemName>
    </item>
    <item itemDelimator="," itemState="O" itemType="CHOICE">
    <itemDescription>To install the launcher icon for the FirstSteps.</itemDescription>
    <itemValue>true</itemValue>
    <itemValues>true,flase</itemValues>
    <itemName>-P firstStepsIconBean.active</itemName>
    </item>
    <item itemDelimator="," itemState="O" itemType="CHOICE">
    <itemDescription>To install the launcher for the LogAnalyzer</itemDescription>
    <itemValue>true</itemValue>
    <itemValues>true,false</itemValues>
    <itemName>-P logAnalyzerIconBean.active</itemName>
    </item>
    <item itemDelimator="" itemState="O" itemType="TEXT">
    <itemDescription>Change the path to the prerequisite checker configuration file only if
a new
file has been provided.  Make sure the corresponding DTD is also presented in the
same path.</itemDescription>
    <itemValue>waspc/prereqChecker.xml</itemValue>
    <itemName>-W osLevelCheckActionBean.configFilePath</itemName>
    </item>
    <item itemDelimator="" itemState="C" itemType="TEXT">
    <itemDescription>If -P ihsPluginBean.active="true", and -P
ihsFeatureBean.active="false", it
is required.  It should be the fully qualified path, including the config file
name.</itemDescription>
    <itemValue>"C:\Program Files\IBMHTTPServer\conf\httpd.conf"</itemValue>
    <itemName>-W defaultIHSConfigFileLocationBean.value</itemName>
    </item>
    <item itemDelimator="" itemState="C" itemType="TEXT">
    <itemDescription>If -P ishPluginBean.active="true, it is required.  It should be the
fully qualified path, including the config file name.</itemDescription>
    <itemValue>Location of the config file</itemValue>
    <itemName>-W defaultIHS20ConfigFileLocationBean.value</itemName>
    </item>
    <item itemDelimator="" itemState="C" itemType="TEXT">
    <itemDescription>If -P apachePluginBean.active ="true", it is required.  It should be
the fully
qualified path, including the config file name.</itemDescription>
    <itemValue>Location of the config file </itemValue>
    <itemName>-W defaultApacheConfigFileLocationBean.value</itemName>
    </item>
    <item itemDelimator="" itemState="C" itemType="TEXT">
    <itemDescription>If -P apache20PluginBean.active="true", it is required.  It should be
the
```

Figure 13f

Example WAS Version 5.1 Description in XML (cont.)

```
fully qualified path, including the config file name.</itemDescription>
    <itemValue>Location of the config file</itemValue>
    <itemName>-W defaultApache20ConfigFileLocationBean.value</itemName>
    </item>
    <item itemDelimator="" itemState="C" itemType="TEXT">
    <itemDescription>If -P iplanet60PluginBean.active="true", it is required.  It should be
the
fully qualified path, including the config file name.</itemDescription>
    <itemValue>Location of the config file</itemValue>
    <itemName>-W defaultIPlanetConfigFileLocationBean.value</itemName>
    </item>
    <item itemDelimator="" itemState="C" itemType="TEXT">
    <itemDescription>If -P dominoPluginBean.active="true", it is required.  It should be the
fully qualified path, including the Jar file name.</itemDescription>
    <itemValue>Location of the Jar file</itemValue>
    <itemName>-W dominoPanelBean.notesJarFile</itemName>
    </item>
    <item itemDelimator="" itemState="C" itemType="TEXT">
    <itemDescription>If -P dominoPluginBean.active="true", it is required.  It should be the
fully
qualified path, including the file name.</itemDescription>
    <itemValue>Location of the file</itemValue>
    <itemName>-W dominoPanelBean.namesFile</itemName>
    </item>
    <item itemDelimator="," itemState="O" itemType="CHOICE">
    <itemDescription>For product registration for silent install.</itemDescription>
    <itemValue>false</itemValue>
    <itemValues>false,true</itemValues>
    <itemName>-W launchPRTBean.active</itemName>
    </item>
    <item itemDelimator="," itemState="O" itemType="CHOICE">
    <itemDescription>To install the default Applications</itemDescription>
    <itemValue>true</itemValue>
    <itemValues>true,false</itemValues>
    <itemName>-W installSampleAppSequenceBean.active</itemName>
    </item>
    <item itemDelimator="," itemState="O" itemType="CHOICE">
    <itemDescription>To display First Steps at the end of the
installation.</itemDescription>
    <itemValue>false</itemValue>
    <itemValues>false,true</itemValues>
    <itemName>-W firstStepsSequenceBean.active</itemName>
    </item>
    <item itemDelimator="," itemState="O" itemType="CHOICE">
    <itemDescription>To run the Insallation Verification Tool.</itemDescription>
    <itemValue>true</itemValue>
    <itemValues>true,false</itemValues>
    <itemName>-W installIvtAppSequenceBean.active</itemName>
    </item>
  </item>
</itemDefinition>
```

Figure 13g

SOLUTION BUILDER WIZARD

BACKGROUND OF THE INVENTION

1. Field of the Invention

This invention relates to a Solution Builder Wizard that utilizes templates and interfaces with predefined intelligence to allow speedy assembly of various software components into one cohesive product form.

2. Background of the Invention

Recently, a shift has occurred among enterprise computing supplies to address "vertical markets". These "solutions" are targeted to the specific needs, business processes, and problems for a certain industry, such as insurance claim processing, health care insurance filing, mortgage application handling, etc. Industry solutions often consists of one or more operating systems and middleware products that are packaged along with customized, industry specific, data, and code that are installed and configured to function as one cohesive business solution. There are many software and consulting firms who are focused on implementing vertical industry solutions using a collection of disparate products produced by a wide array of vendors.

To implement a vertical industry solution, a single expert is not sufficient to complete the project because it requires expert level skills and knowledge of such a wide array of products, systems, platforms, configurations, options, protocols, etc. Further, all of these different components must be integrated and cooperate with each other in specific, often proprietary ways.

As a result, a team of specialists are usually required to install and deploy the entire project. To mitigate risk, customers often request that a prototype or proof of concept system be installed or demonstrated in order to provide concrete evidence of viability of the solution, and of the business value of the solution, prior to purchase.

This places much engineering and development work up front and before a formal purchase order is issued, which increases the financial risk to the supplier or suppliers. In some cases, it can take eight weeks or even more to gather requirements, and to create a prototype that solves the customer's problems. Then, it can take months to implement and test a prototype, including producing some sort of data which simulates various scenarios and test cases.

This "up front" effort requires a massive amount of time and expenditures in some cases. Because it lasts so long, there is a very real possibility that components (e.g. software applications, operating systems, etc.) will be revised and patched, so the final configuration, if ordered, will have unknown characteristics as the newer releases and patches will also have to be integrated and tested before formal deployment.

Thus, the processes currently employed in the industry place a heavy risk and financial burden on the supplier prior to a sale being completed, which is reflected in the pricing of the final systems to the customers, the increased cost of which must be either absorbed by the customers or passed on to their own clients. In either situation, the customer may either experience reduced profitability, reduced ability to compete on price, or both.

SUMMARY OF THE INVENTION

A palette is displayed containing icons representing available system components for use in a solution. Associated with the icons are partially defined behavioral models, implementation logic, and user-modifiable parameters and options in a markup language format. Instances of the configurable behavioral models are instantiated through selection by a user. A design area of the display shows icons for the instances, where they are placed and arranged by the user, including connection logic and user-input model interface and behavioral logic parameters. The models are configured according to the parameters by modifying the associated markup language. A system solution behavioral model is automatically created in a modeling language comprising a collection of the interconnected and fully defined component behavioral model instances, allowing simulation of operation of the system solution.

Each time the solution developer specifies or creates a "connection" between two components in the design area, the invention invokes specific logic which determines the needed configuration and option parameters to interface the selected components to each other. This logic provides a "pop-up" dialogue to the solution developer to prompt the user for selections and input. The input information is then used by the logic to configure the two components to interact with each other within the pre-defined constraints and conditions of the logic, thereby relieving the user of needing to be an expert in the configuration and installation of either of the components.

For example, a component palette may include an IBM DB/2 database icon, an IBM WebSphere web server application icon, and an IBM MQ server icon with a backend server such as an IBM 390. The solution developer can drag an instance of the DB/2 icon from the palette to the solution design area of the display, thus making it a component of the current solution. Next, the developer can drag an instance of the WebSphere from the palette to the design area, followed by connecting it to the DB/2 instance, or followed by dragging and dropping more instances of more components.

When a connection between two or more components is made or defined, the invention automatically recognizes the need for customization information for this type of connection, and prompts the developer to enter the required configuration data necessary to make the connection valid and functional, such as user id and password, data source, network address, encryption options, etc. This information is then saved to configuration files which can later be used during actual installation of the system components into the solution.

BRIEF DESCRIPTION OF THE DRAWINGS

The following detailed description when taken in conjunction with the figures presented herein provide a complete disclosure of the invention.

FIG. 10 shows an example DB2 database model in UML.

FIG. 11 shows an Item Description DTD according to the preferred embodiment for the model of FIG. 10.

FIGS. 12a and 12b show an example item description in XML for an MQ Series server component, also according to the example DTD of FIG. 11.

FIGS. 13a-13g show an example item description in XML for a WAS component according to the example DTD of FIG. 11.

DESCRIPTION OF THE INVENTION

Figure 1:
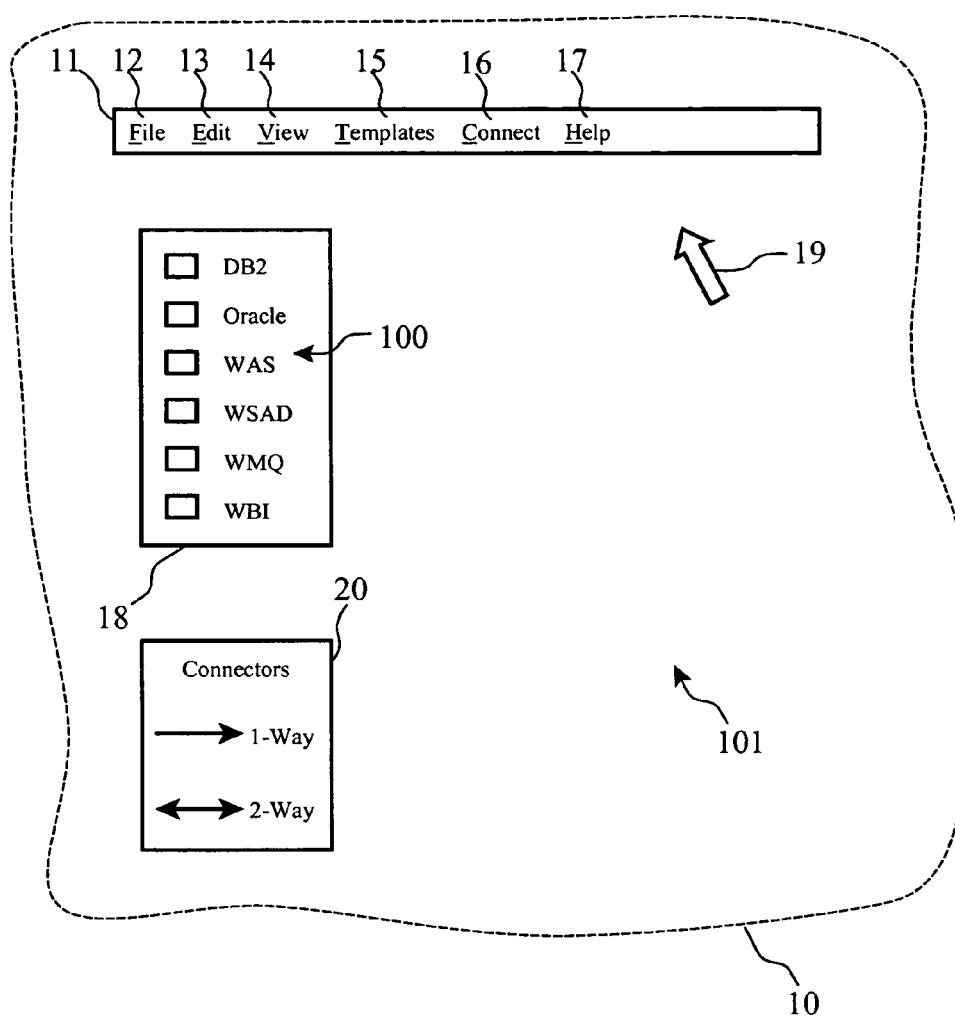
FIG. 1 shows a sample view of the Solution Builder Wizard GUI.

Our invention, referred to as the "Solution Builder Wizard", uses a Graphical User Interface ("GUI"), a set of pre-defined "templates" for each component, and implementation intelligence logic, to enable speedy assembly of various solution components together into one cohesive solution. Each "template" coupled with the implementation logic for each combination of component interfaces defines a set of configuration options and parameters which can be used to customize the combination of components, without need of a high level of expertise in either component. Preferably, the templates incorporate the most common options and configurations employed, leaving out obscure or rarely used options to reduce confusion by the system developer. Default configuration parameters and values may aid in quickly defining interfaces between components so that the system developers must only change the parameters that need to be changed from default values.

Prototypes and proof of concept systems can be quickly achieved using pre-defined interfaces and configurations between disparate components of the solution. Using the invention, a tangible, operable solution can be demonstrated and tested in less time than using traditional processes, because all components are integrated with each other based upon the templates rather than upon customized or semi-customized interface and configuration definitions from various experts.

In an aspect of a preferred embodiment, each component is declared as an object using eXtensible Markup Language for the templates. Because of this advantage, the solution can be defined in a written format which can then be archived and managed by any of the widely available and widely used code repository systems, such as CATIA Viewing Services ("CVS"), IBM's Configuration Management and Version Control ("CMVC") system, Serena™ Software's PVCS Version Manager, or a similar product.

Terms, Definitions and Related Technology

We will first describe some terms and related technologies which will be of use in understanding the present invention and one or more preferred embodiments.

Unified Modeling Language ("UML") is an open standard for notation of modeling of objects in the real-world. The objects can conceivably be any real thing, such as a computer with a specific program, a system device such as a printer, a peripheral such as a motor, etc. Modeling such objects is usually a first step in developing an object-oriented design methodology. UML's notation derives from approaches of three other object-oriented design and analysis methodologies, including Grady Booch's methodology for describing a set of objects and their relationships, James Rumbaugh's Object-Modeling Technique ("OMT"), and Ivar Jacobson's approach which includes a use case methodology, according to one online Information Technology source WhatIs? (dot-.com). The UML standard is now maintained and promoted by the Object Management Group. In the following paragraphs, it shall be understood that references to UML are to one available embodiment, and that use of alternate modeling languages and methodologies may be employed without departing from the spirit and scope of the invention.

Graphical User Interface ("GUI") is an user interface that is based on graphics such as icons, menus, and pictures. In the late 1970's, the Xerox Palo Alto Research Laboratory first created the GUI concept. Today, users are most familiar with either the Apple MAC™ or Microsoft's Window™ operating systems. Most applications today use the elements of the GUI that come with the operating system and add or modify their own graphical user interface elements for customization. GUI elements can consists of items such as: windows, buttons, iconic images, pull-down menus, wizards, and mouse. Often the phrase "look-and-feel" is use to describe a system's GUI along with its input devices. In the following paragraphs, it shall be understood that references to GUI are to just one available embodiment, and that use of alternate platform and methodologies may be employed without departing from the spirit and scope of the invention.

Eclipse is an open platform aims as a tool for integration built by an open community of tool providers such as Borland™, International Business Machines ("IBM")™, and Red Hat™. It is designed to build integrated development environments ("IDEs") which allow the creation of diverse end-to-end computing solutions for multiple computer environments while providing flexibility and management for developers in their software technology. According to the Eclipse Foundation, it has formed an independent open ecosystem around royalty-free technology and an universal platform for tools integration. The Eclipse platform is a mechanism for discovering, integrating, and running modules called plug-ins based on the foundation's white paper. The plug-in based framework enables ease in creation, integration, and utilization of software tools. Developers have the privilege to choose in a multi-language, multi-platform, multi-vendor environment. The Eclipse Platform is written in Java language and comes with extensive plug-in construction tool kits and examples. It has been deployed on a range of development workstations including Linux, HP-UX, AIX, Solaris, QNX, OSx, and Windows based systems. In the following paragraphs, it shall be understood that references to Eclipse are to one available embodiment, and that use of alternate platform and methodologies may be employed without departing from the spirit and scope of the invention.

WebSphere Application Server ("WAS") is a comprehensive web services technology-based application server that integrates enterprise data and transactions. It is a complete Java-servlet based Web server environment consisting of two major components: a complete runtime environment and an integrated tools environment. It is a web-based tool that allows management and deployment of dynamic enterprise applications while handling extensive Java 2 Enterprise Edition ("J2EE"), security, scalability, and application performance. According to its latest product overview, it provides virtually any-to-any connectivity with transaction management and application adaptively, because it is optimized for ease of administration in a scalable, single-server deployment environment. WAS supports key Web service open standards, such as Simple Object Access Protocol ("SOAP"), Universal Description, Discovery, and Integration ("UDDI"), and Web Service Description Language ("WSDI"). WAS can be used on a variety of platforms such as Sun Solaris, Windows NT, IBM AIX/6000, and IBM OS/2. Other similar products that exists today is BEA Weblogic Application Server™ and JBoss™ own suite of tools. In the following paragraphs, it shall be understood that references to WAS are to just one available embodiment, and that use of alternate platform and methodologies may be employed without departing from the spirit and scope of the invention.

WebSphere Studio Application Developer ("WSAD") is a development environment tool that is role based which developers can use to simulate test environments, handle deployment, and transmit message queues such as XML messages. The WebSphere Studio family of tools is build on top of the Eclipse Workbench as a set of plug-ins conforming to the Eclipse's open standard Application Program Interface ("API"). It is designed for professional developers of Java and J2EE applications who require integrated Java, Web, XML, and Web services support. Because users can build and test business logic inside the WSAD before deploying to a production server, it has the advantages for early detection in performance bottleneck and shorten the actual test cycle with its advanced code generation. All development resources for all projects are stored in a single repository, and users have team support and can easily share work products. In the following paragraphs, it shall be understood that references to WSAD are to just one available embodiment, and that use of alternate platform and methodologies may be employed without departing from the spirit and scope of the invention.

WebSphere Business Integration ("WBI") is a part of WebSphere suite of tools that extends using the Eclipse workbench to model, simulate and manage business integration, workflows, and processes. The WBI brand encompasses a number of software technologies that offer various business integration capabilities such as WBI Modeler, WBI Server, WBI Server Foundation, WBI Message Broker, WBI Connect, WBI Administration Tools, and WBI Design Tools. These tools facilitate users to quickly model, simulate, and analyze complex business scenarios before they are implemented by integrating with existing or new software components. In addition, the administration and design tools allow for ease in system administration and workflow creation which shares some similarities to IBM's Rational™ software. In the following paragraphs, it shall be understood that references to WBI are to just one available embodiment, and that use of alternate platform and methodologies may be employed without departing from the spirit and scope of the invention.

WebSphere MQ ("WMQ") formerly known as IBM's MQ Series is a message queue system that exchanges information such as using XML to communicate across various platforms while integrating new and existing applications. It is a synchronous or asynchronous method of communicating between processes. It allows applications that resides on same server, different servers, or even different network across a global application environments to send and receive reliable and secured requests between each other. WMQ is integrated with latest Java™ Messaging Service interface standard and offers comprehensive security options using the Secure Socket Layer ("SSL"). One advantage of WMQ is its ability to dynamically distribute workloads across available resources which enables messages to be delivered error-free and protects from unauthorized access. There are other message queue systems such as Microsoft's Message Queue ("MSMQ")™, Sun Java System Message Queue ("JMS")™, and Progress Software SonicMQ™. In the following paragraphs, it shall be understood that references to WMQ are to just one available embodiment, and that use of alternate platform and methodologies may be employed without departing from the spirit and scope of the invention.

Graphical User Interface

Turning to FIG. 1, the diagram shows a sample view of the Solution Builder Wizard GUI (10) according to a preferred embodiment of the invention. In the GUI, which is shown on a portion of a computer display (10), there is a customizable menu bar toward the top (11) which allows the user the ability to navigate through a file (12), edit the component palette (13), change the view option (14), select a template (15), create a connection between application components (16), or seek help (17) within the GUI application.

The GUI is pre-loaded with various solution components (100) shown in a solution component palette (18), and related intelligence logic based on customization. The available solution components can consist of different types of databases, such as DB2 or Oracle, or other application software such as WAS, WSAD, WMQ, and WBI. According to the preferred embodiment, additional solution component options can be added to the palette (18) as needed.

Connectors (20) that interface solution components with one another are shown in the palette (18), optionally. A cursor (19) is used by a developer to navigate, select, and create the solution design through the GUI, by moving components (100) from the palette (18) to the solution design area (101) of the GUI.

Figure 2A:
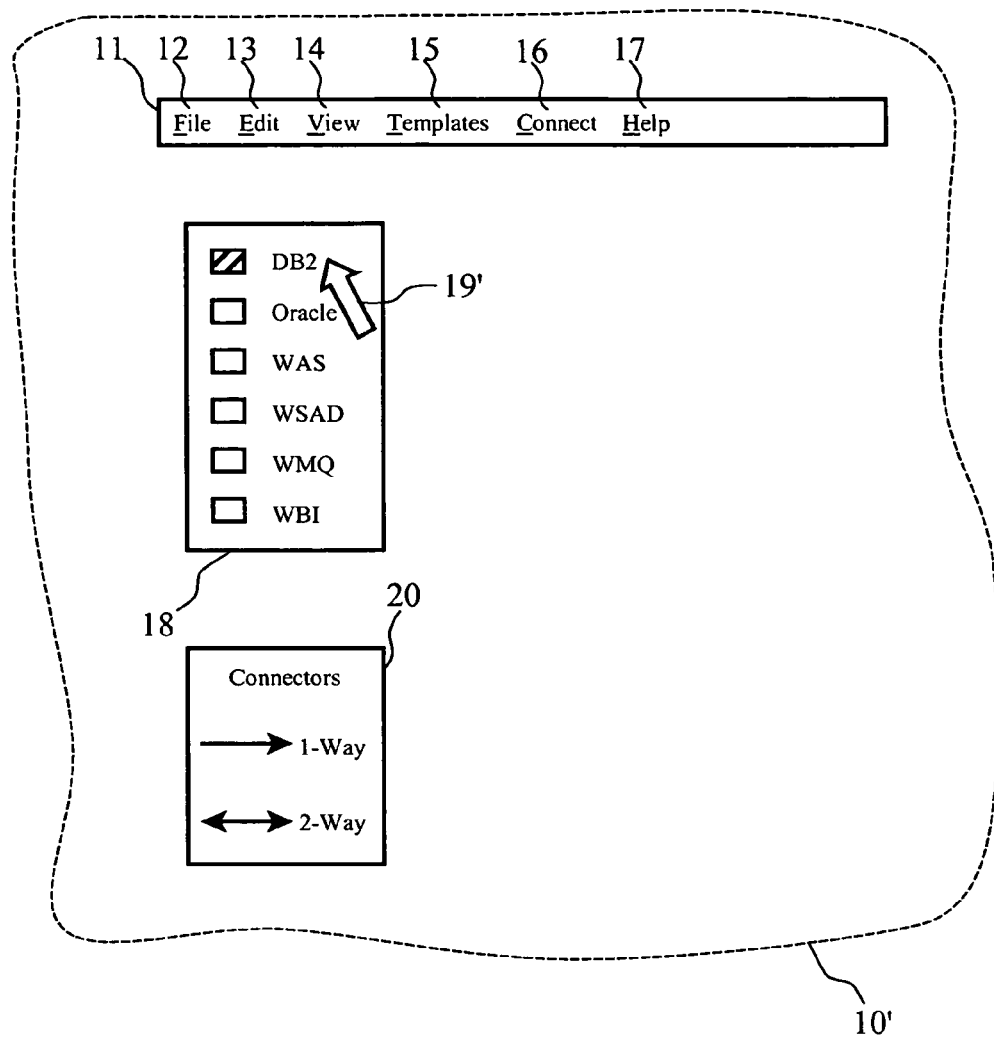
FIGS. 2 and 3 depicts how the cursor is used to drag and drop solution components from the component palette to a design area.
Figure 2B:
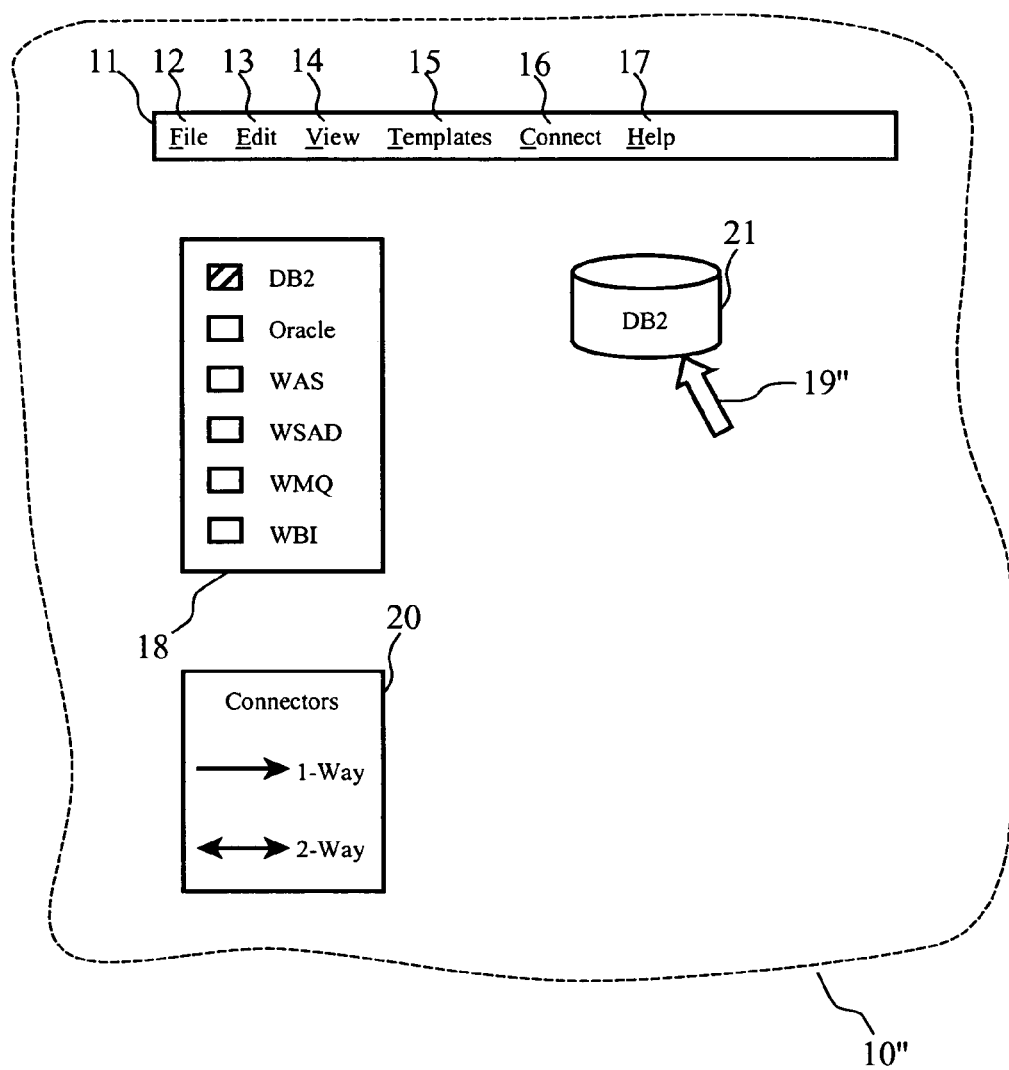

For example, FIGS. 2a and 2b show how the cursor is used to first select (19') a component in the palette, such as a DB2 database component, then drag it into the design area of the GUI, and dropping it (19") to create a new instance of a DB2 database in the solution design.

Creation of Component Instances and Relationships

Figure 3:
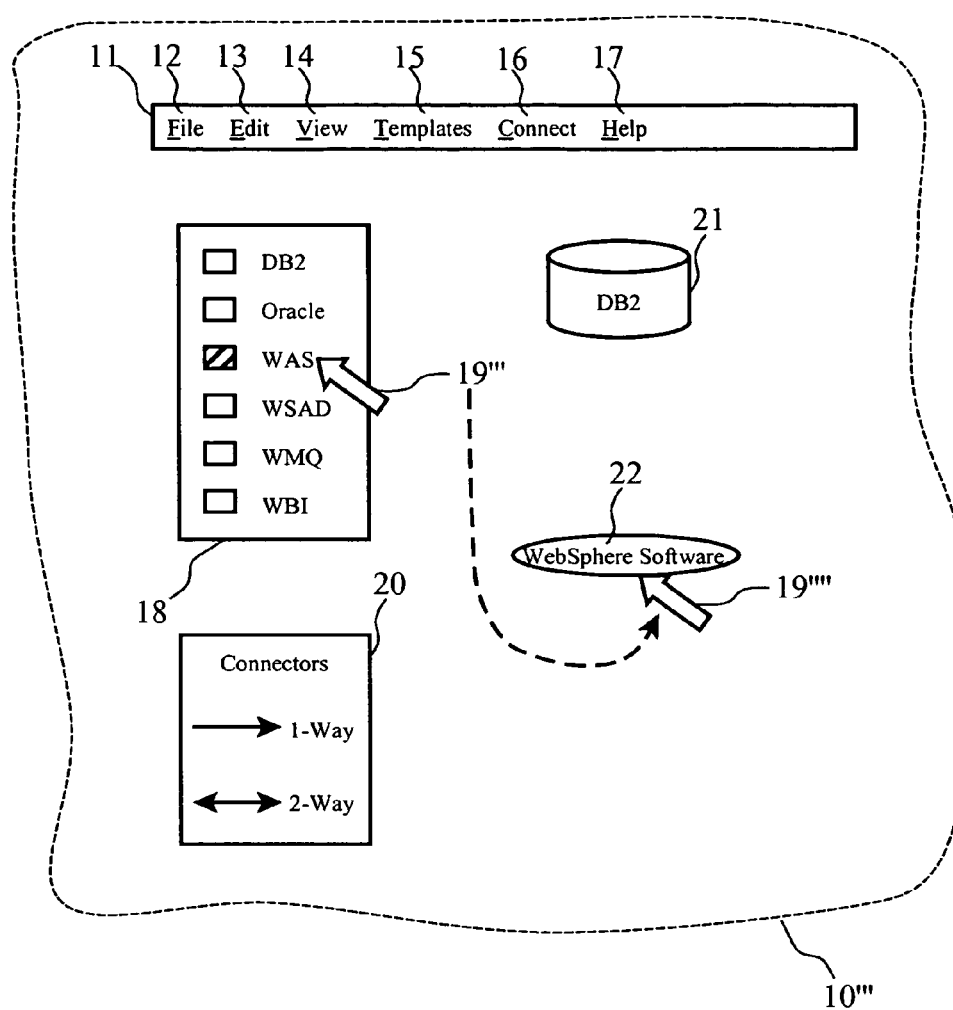

In FIG. 3, a subsequent drag and drop operation by the user has added a second component from the palette to the design area, in this example an instance of a WebSphere Application Server (22) ("WAS"). Now, the solution under design has two components—an instance of a DB2 database (21), and an instance of WAS (22).

Figure 4:
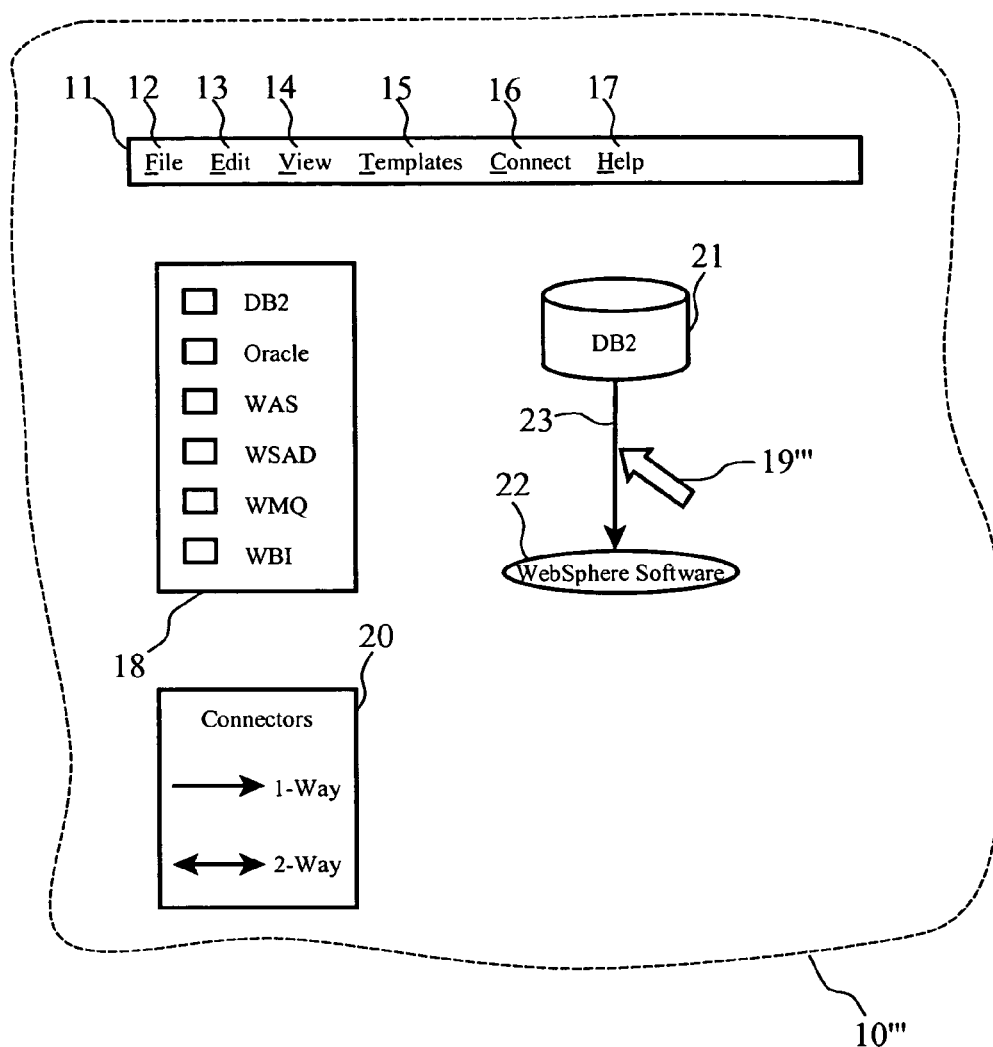
FIG. 4 illustrates how interfaced between components are defined.

At this point, the developer could continue to drag-and-drop components from the palette to the design area to create more instances of components in the design, or the developer can begin to define the relationships between the components already in the design. For example, by using the one-way or two-way connectors available in the GUI, FIG. 4 illustrates how components are interfaced to each other. The types of relationships available to the user is based on the predefined templates associated with each solution component. The cursor can be used to select a one-way data flow definition tool (single-headed arrow in the palette), for example, then it can be clicked once to define one end of the arrow icon (e.g. the input or output), say on the DB2 instance (21), and then clicked a second time on another component, such as the WAS (22) instance. This results in the graphical creation of an arrow (23) showing one-way data flow from the database component to the WAS component.

Figure 5:
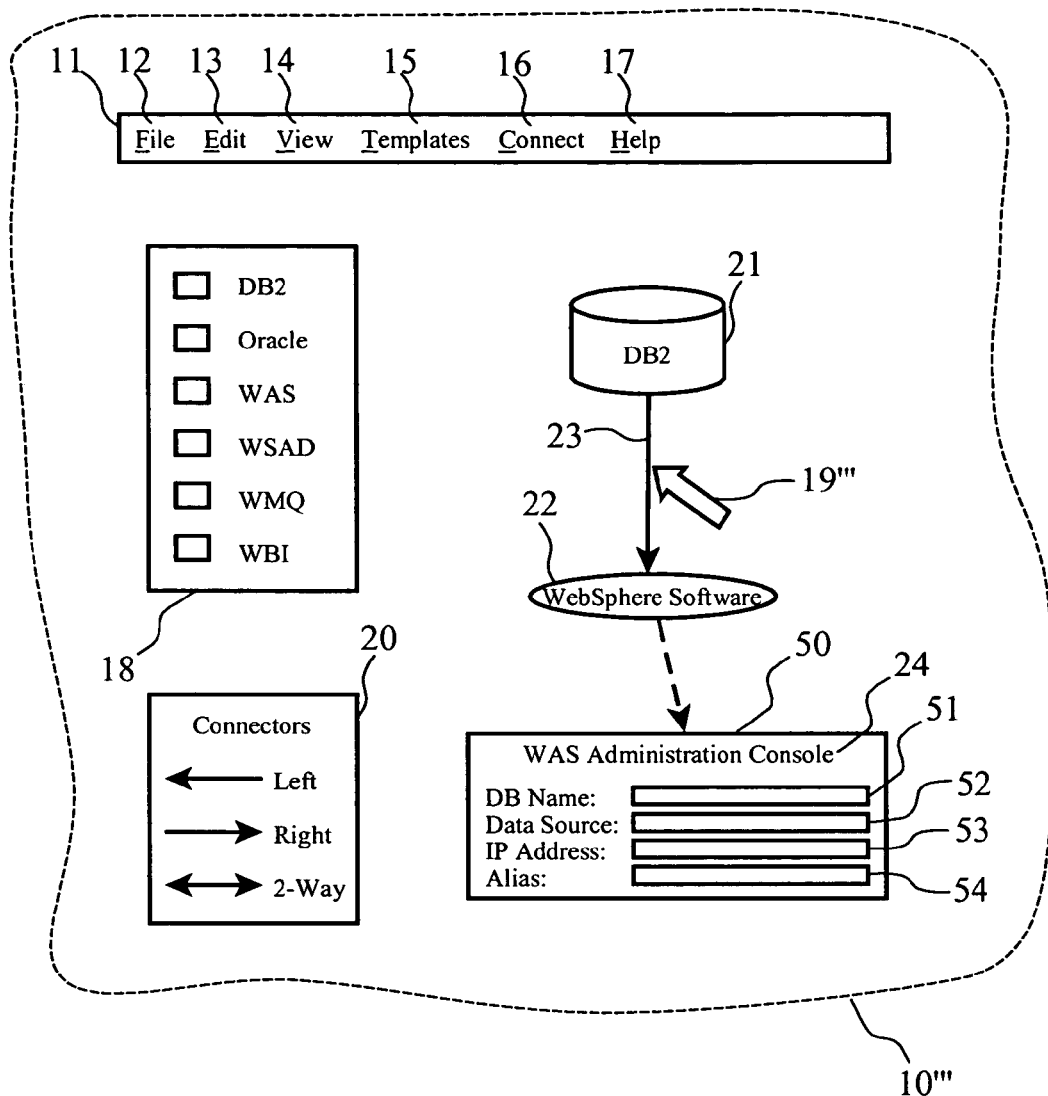
FIG. 5 shows an example user prompt for defining connection options and configuration parameters.

Once a relationship is established between two components, the intelligence logic of the invention automatically prompts the user for inputs to complete required fields that facilitate the integration process according to pre-defined options and configuration features, as defined by the XML templates. Continuing with our example and turning to FIG. 5, the user input prompt window (50) is automatically displayed by the invention's logic once a connection is completed. In this case, a WAS Administration Console is shown, requesting the user to input fields to define the interface between the WAS to the DB2, such as the database name (51), its source (52), the Internet Protocol ("IP") address (53), and an alias (54) that denotes the username and password.

Connection Intelligence Logic

Figure 6:
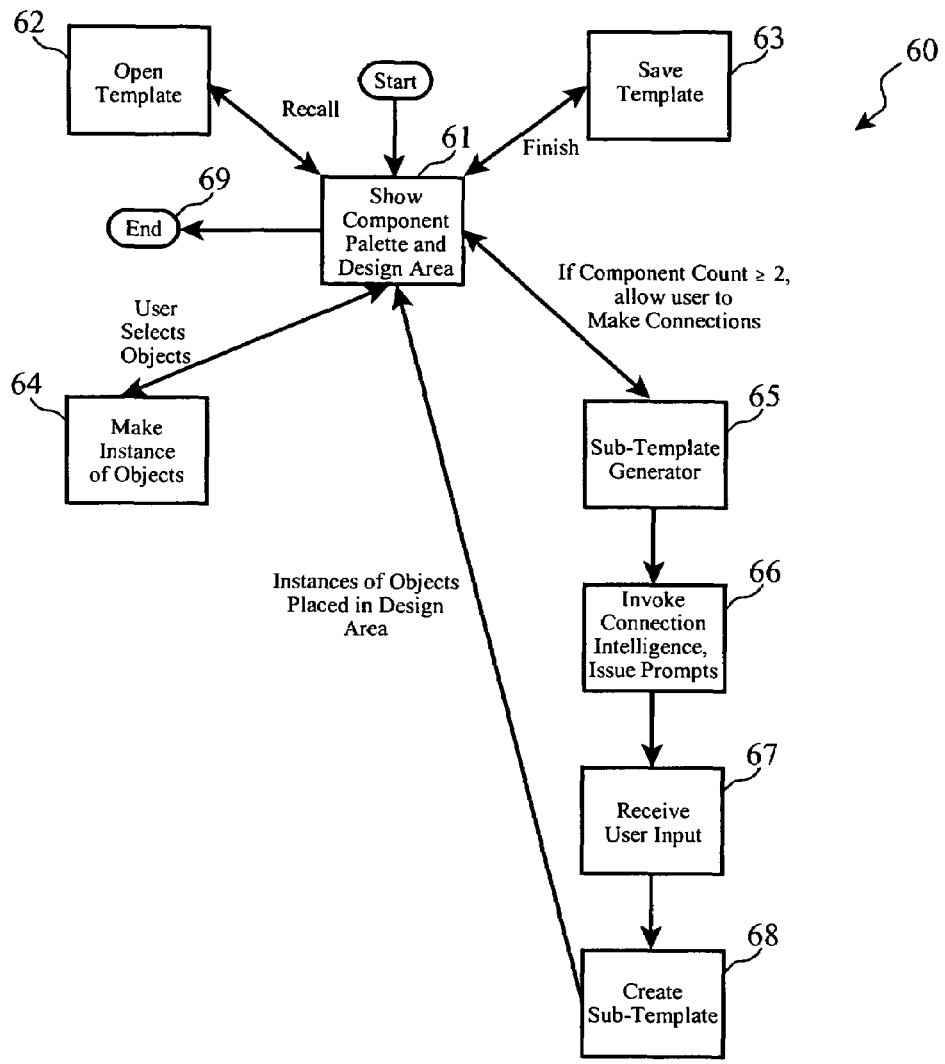
FIG. 6 illustrates a logical process for intelligent interface definition between components.

Turning to FIG. 6, a connection intelligence logical process (60) according to the invention is depicted. The GUI shows (61) a component palette and design area on the display of the developer's computer. The design area may be clear if starting a new design, or it can include components previously defined and saved (63). A "recall" (62) option allows the developer to open or import a previously saved solution design into the design area.

When each solution component in the palette is selected, dragged and dropped into the design area by the user, an object instance is created (64) in the design area. Multiple instances of the same type component can be created in this manner (e.g. multiple DB2 instances or multiple WAS instances).

Once at least two components have been added to the design area, the user can use the "make connection" option at any time. Each time a relationship between two or more components is established, a sub-template generator (65) is invoked. This displays an intelligence form (66) on the GUI to request user inputs for required and optional fields related to defining the interface between the components. When the inputs are received (67) from the user, the design area is updated to show the connection, and the sub-template is saved which defines the interface between the related components.

Figure 7:
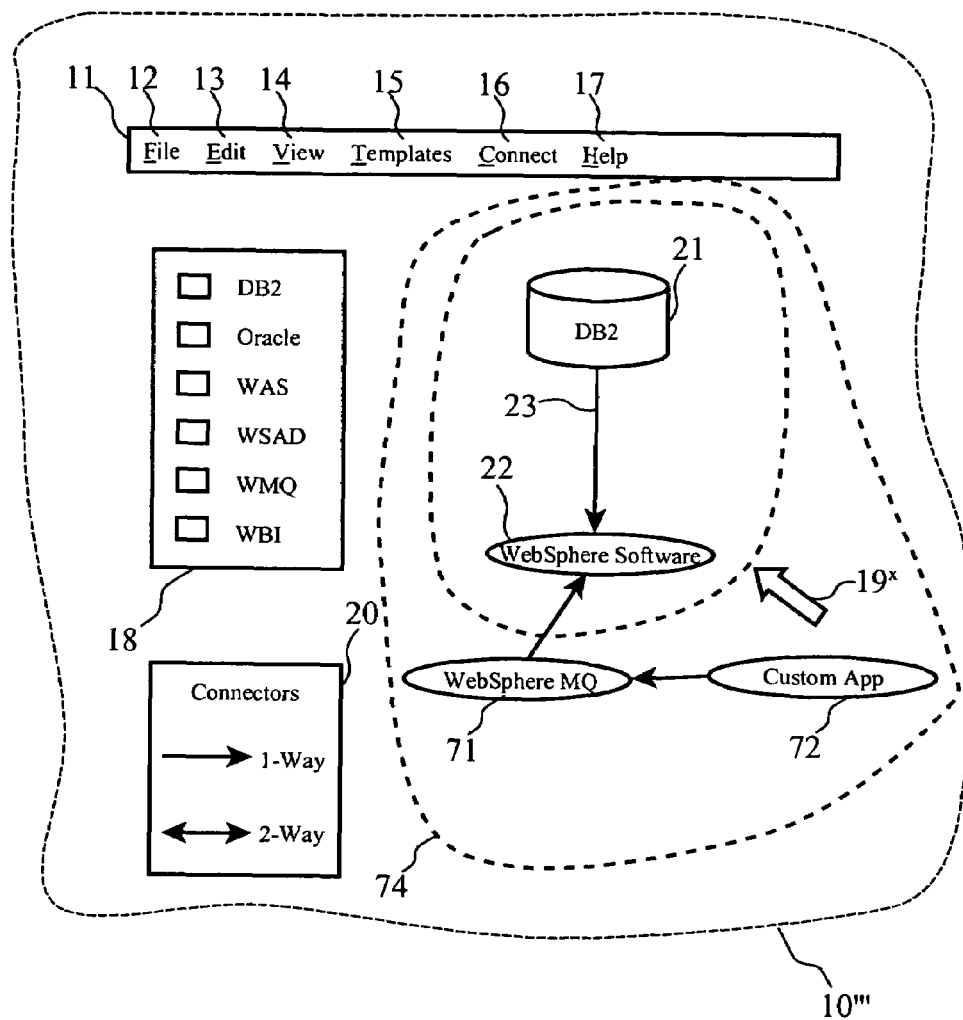
FIG. 7 shows the process in saving a partial sub-system using the GUI tool.

Turning to FIG. 7, the figures shows the process of saving a partial sub-system using the GUI tool (70). After a user has completed creating the component instances, such as adding to the previous example an instance of WMQ (71), and a custom application (72) (e.g. proprietary software, a web browser, etc.), and has defined the relationships of the components, the user can save the whole solution, or just partial sub-solutions for reuse.

For example, if the user wishes to save the entire solution including all of the component instances and their relationships, the user selects all of the components in a manner such as dragging a selection line (74) around all of the components. If the user only wishes to save a partial sub-system or sub-solution, one may select only those components for saving, such as drawing a selection line (73) around the DB2 and WAS components, followed by performing a "save" function. This capability of the invention enables users to quickly create, add, or modify existing solutions through use of individual components as well as reuse of previously defined partial solutions.

Solution Builder Wizard Advantages

Using these methods, the Solution Builder Wizard provides user the ability to quickly develop a cohesive solution using a GUI palette to create the necessary components and establish the desired logical relationships between each other. The ease in drag and drop eliminates the complexity in integration and simplifies the required input information without the user having to sort through tedious amounts of manuals and guidebooks in installation and deployment. This results in massive amount of time, resource, and expense saved using this preferred embodiment. Not only can the proof of concept be swiftly completed, but also the enormous amount of time that can be saved during the actual installation, test, and deployment phase.

Users now have the ability to see actual or close to real simulated environment before actual development occurs. The GUI provides a one-stop shop for developers to create prototypes using a variety of application components and integrate them using the simplified process driven by the intelligence logic. By updating the templates on-the-fly in the GUI, productivity increases dramatically. The flexibility of using UML allows the solution to be define in a written format that can easily be edited or modified if necessary in CVS file format.

Component Solution Templates

As mentioned earlier, the preferred embodiment includes UML models of each available solution component written in XML. FIG. 10 shows an example DB2 database model in UML.

To correctly interpret information contained in an XML file, a system must also have an associated Document Type Definition ("DTD") file, which is file defining and constraining the data or statements allowed in an XML file for a specific purpose.

FIG. 11 shows an Item Description DTD according to the preferred embodiment for the model of FIG. 10. FIGS. 12a and 12b show an example item description in XML for an MQ Series server component, also according to the example DTD of FIG. 11. FIGS. 13a-13g show an example item description in XML for a WAS component according to the example DTD of FIG. 11, as well.

Suitable Computing Platform

The invention is preferably realized as a feature or addition to the software already found present on well-known computing platforms such as personal computers, enterprise servers, and web servers. These common computing platforms can include properly configured personal computers, as well as portable computing platforms, such as personal digital assistants ("PDA"), web-enabled wireless telephones, and other types of personal information management ("PIM") devices, providing that they have suitable resources to support the software applications and logical processes as described in the foregoing paragraphs.

Therefore, it is useful to review a generalized architecture of a computing platform which may span the range of implementation, from a high-end web or enterprise server platform, to a personal computer, to a portable PDA or web-enabled wireless phone.

Figure 8:
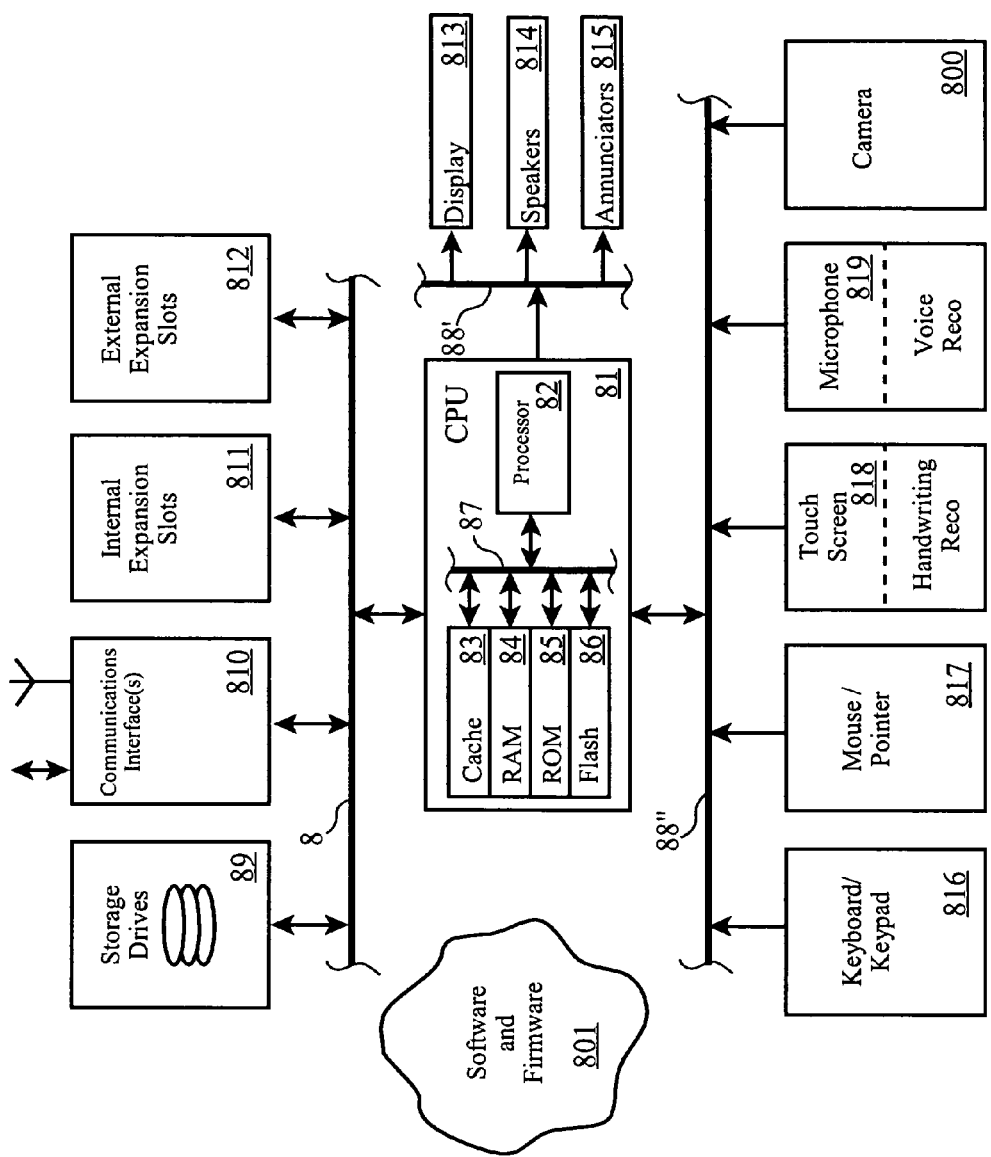
FIG. 8 depicts a generalized computing platform architecture, such as a personal computer, server computer, personal digital assistant, web-enabled wireless telephone, or other processor-based device.

Turning to FIG. 8, a generalized architecture is presented including a central processing unit (81) ("CPU"), which is typically comprised of a microprocessor (82) associated with random access memory ("RAM") (84) and read-only memory ("ROM") (85). Often, the CPU (81) is also provided with cache memory (83) and programmable FlashROM (86). The interface (87) between the microprocessor (82) and the various types of CPU memory is often referred to as a "local bus", but also may be a more generic or industry standard bus.

Many computing platforms are also provided with one or more storage drives (89), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (810), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (811), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (812) allowing the user the ability to easily install and remove hardware expansion devices, such as PCMCIA cards, SmartMedia cards, and various proprietary modules such as removable hard drives, CD drives, and floppy drives.

Often, the storage drives (89), communication interfaces (810), internal expansion slots (811) and external expansion slots (812) are interconnected with the CPU (81) via a standard or industry open bus architecture (88), such as ISA, EISA, or PCI. In many cases, the bus (88) may be of a proprietary design.

A computing platform is usually provided with one or more user input devices, such as a keyboard or a keypad (816), and mouse or pointer device (817), and/or a touch-screen display (818). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (18) is usually provided, often with handwriting recognition capabilities.

Additionally, a microphone (819), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (800), such as a still digital camera or full motion video digital camera.

One or more user output devices, such as a display (813), are also provided with most computing platforms. The display (813) may take many forms, including a Cathode Ray Tube ("CRT"), a Thin Flat Transistor ("TFT") array, or a simple set of light emitting diodes ("LED") or liquid crystal display ("LCD") indicators.

One or more speakers (814) and/or annunciators (815) are often associated with computing platforms, too. The speakers (814) may be used to reproduce audio and music, such as the speaker of a wireless telephone or the speakers of a personal computer. Annunciators (815) may take the form of simple beep emitters or buzzers, commonly found on certain devices such as PDAs and PIMs.

These user input and output devices may be directly interconnected (88', 88") to the CPU (81) via a proprietary bus structure and/or interfaces, or they may be interconnected through one or more industry open buses such as ISA, EISA, PCI, etc.

The computing platform is also provided with one or more software and firmware (801) programs to implement the desired functionality of the computing platforms.

Figure 9:
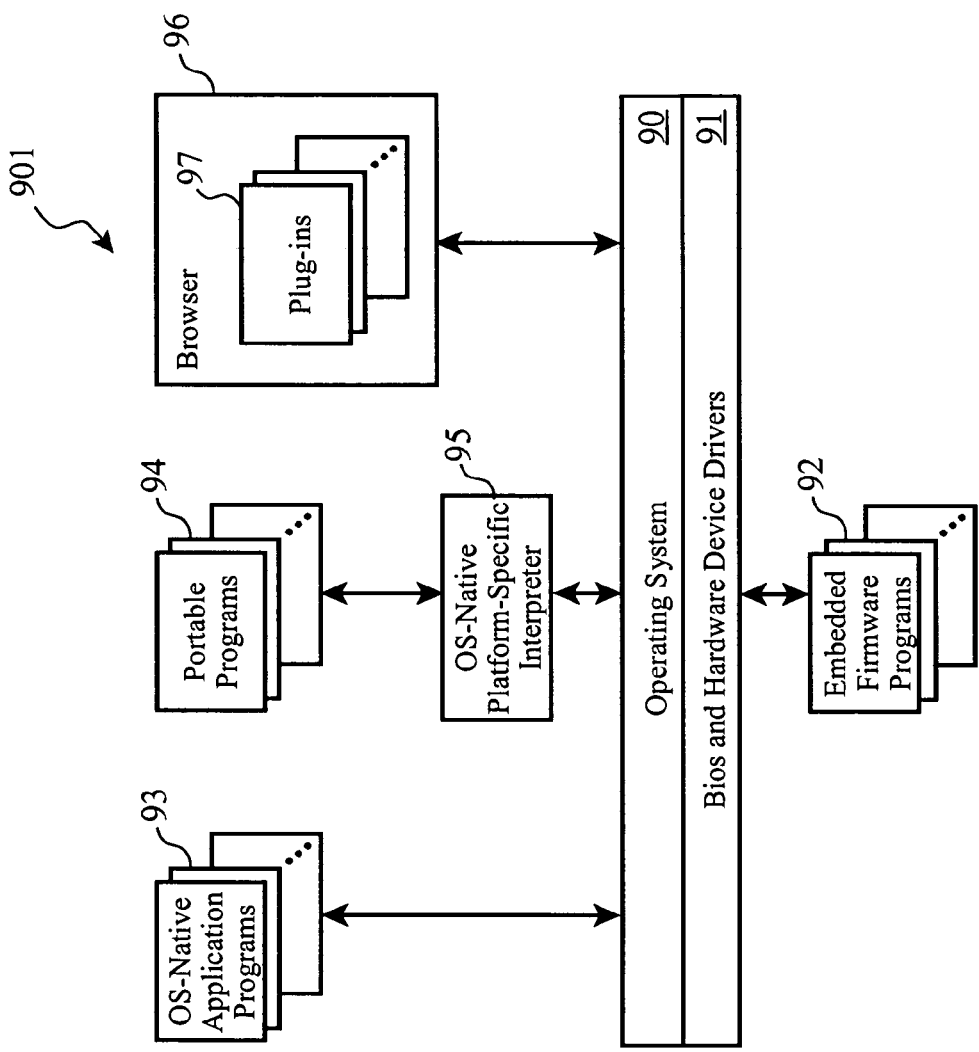
FIG. 9 shows a generalized organization of software and firmware associated with the generalized architecture of FIG. 8.

Turning to now FIG. 9, more detail is given of a generalized organization of software and firmware (801) on this range of computing platforms. One or more operating system ("OS") native application programs (93) may be provided on the computing platform, such as word processors, spreadsheets, contact management utilities address book, calendar, email client, presentation, financial and bookkeeping programs.

Additionally, one or more "portable" or device-independent programs (94) may be provided, which must be interpreted by an OS-native platform-specific interpreter (95), such as Java™ scripts and programs.

Often, computing platforms are also provided with a form of web browser or micro-browser (96), which may also include one or more extensions to the browser such as browser plug-ins (97).

The computing device is often provided with an operating system (90), such as Microsoft Windows™, UNIX, IBM OS/2 ™, LINUX, MAC OS ™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (91) are often provided to allow the operating system (90) and programs to interface to and control the specific hardware functions provided with the computing platform.

Additionally, one or more embedded firmware programs (92) are commonly provided with many computing platforms, which are executed by onboard or "embedded" microprocessors as part of the peripheral device, such as a micro controller or a hard drive, a communication processor, network interface card, or sound or graphics card.

As such, FIGS. 8 and 9 describe in a general sense the various hardware components, software and firmware programs of a wide variety of computing platforms, including but not limited to personal computers, enterprise servers, web servers, PDAs, PIMs, web-enabled telephones, and other appliances such as WebTV™ units. It will be readily recognized by those skilled in the art that the methods and processes of the present invention may be alternatively realized as hardware functions, in part or in whole, without departing from the spirit and scope of the invention.

CONCLUSION

Certain embodiments and design choices have been described and illustrated in the foregoing paragraphs in order to disclose the invention and its preferred embodiment. It will be appreciated by those skilled in the art, however, that the scope of the invention is not limited to these specific embodiments, and that many variations and choices regarding, but not limited to, operating system, programming language, programming methodology, and platform, can be made without departing from the spirit and scope of the present invention. Therefore, the scope of the present invention should be determined by the following claims.

What is claimed is:

1. A system for designing a computing solution comprising:

a palette displayed on a portion of a computer display, said palette containing a plurality icons representing available computing system components for potential use in a computing solution, said computer display being a portion of a computing platform system;

a memory or storage drive comprising a plurality of electronically configurable behavioral models disposed in said computing platform associated with said available computing system component icons, each configurable behavioral model being partially defined in a behavioral modeling language, each of said partial definitions having incomplete interface definitions and incomplete behavioral logic;

a plurality of templates coupled with implementation logic, each template being associated with one of said configurable behavioral models, each template incorporating user modifiable parameters and options for an associated configurable behavioral model, said templates being in a markup language format;

an instantiator portion of said computing platform configured to instantiate one or more instances of said configurable behavioral models for available computing system components selected by a user using a selection device;

a design area displayed on a portion of said computer display of said computing platform in which one or more icons corresponding to said component instances are placed and arranged under user control;

connection logic portion of said computing platform configured adapted to:

display on said computer display of said computing platform a user prompt for model interface parameters and model behavioral logic parameters for at least two model instances, said user prompt being automatically displayed responsive to a user creating a connection between two or more displayed icons representing said model instances in said design area;

receive from said user via said user prompt one or more model interface parameters and model behavioral logic parameters; and configure said connected model instances using said received model interface parameters and model behavioral parameters through modifying said associated markup language templates, wherein changing said partially defined configurable behavioral model instances to fully defined behavioral model instances and interface parameters of said instances of behavioral models according to said received user inputs; and a system solution behavioral model creator portion of said computing platform configured to:

create an instance of a system behavioral model in a modeling language comprising a collection of said interconnected and fully defined component instance behavioral model instances; and simulate operation of said system solution by simulating said fully defined behavioral model component instances, interfaces, and connections.

2. The system as set forth in claim 1 wherein said a palette of available system components, icons representing instances of components in a design area, and said user input prompt are displayed on a graphical user interface.

3. The system as set forth in claim 2 wherein said user prompt comprises a tillable form to said user.

4. The system as set forth in claim 2 wherein said user prompt comprises a selectable list of options to said user.

5. The system as set forth in claim 1 wherein said icons for available computing system components displayed in said palette comprises at least one icon for each of a database application program, a web server program, an operating system, a custom application program, and a computing platform.

6. The system as set forth in claim 1 wherein said system solution behavioral model creator is further configured to:

allow said user to select less than all of said component instances shown in said design area to define a sub-solution, and create a sub-solution behavioral model instance in a modeling language comprising a collection of fully defined behavioral model instances corresponding to said components of said sub-solution.

7. A method for assembling a computing solution comprising:

displaying on a portion of a computer display a palette containing a plurality icons representing available computing system components for potential use in a computing solution, each of said available components having an associated configurable behavioral model, each configurable behavioral model being partially defined in a behavioral modeling language, each of said partial definitions having incomplete interface definitions and incomplete behavioral;

associating each of a plurality of templates coupled with implementation logic with one of said configurable behavioral models, each template incorporating user-modifiable parameters and options for an associated configurable behavioral model, said templates being in a markup language format;

responsive to selection of one or more of said icons by a user, instantiating one or more partially defined behavioral model instances associated with said selected icons and said partially defined configurable behavioral models;

placing and arranging in a design area on a portion of said computer display one or more icons corresponding to said component partially defined behavioral model instances;

displaying on said computer display of said computing platform a user prompt for model interface parameters and model behavioral logic parameters for at least two model instances, said user prompt being automatically displayed responsive to a user creating a connection between two or more displayed icons representing said model instances in said design area;

receiving from said user via said user prompt one or more model interface parameters and model behavioral logic parameters;

configuring said connected model instances using said received model interface parameters and model behavioral logic parameters through modifying said associated markup language templates, thereby changing said partially defined configurable behavioral model instances to fully defined behavioral model instances; and creating a system solution behavioral model instance in a behavioral modeling language by:

creating an instance of a system behavioral model in a modeling language comprising a collection of said interconnected and fully defined component behavioral model instances; and simulating operation of said system solution by simulating said fully defined behavioral model component instances, interfaces, and connections.

8. The method as set forth in claim 7 wherein said steps of displaying a palette of components, displaying instances of components in a design area, and prompting a user for input are performed using a graphical user interface.

9. The method as set forth in claim 8 wherein said step of receiving user inputs comprises displaying a tillable form to said user.

10. The method as set forth in claim 8 wherein said step of receiving user inputs comprises displaying a selectable list of options to said user.

11. The method as set forth in claim 7 wherein said available computing system components displayed in said palette comprises one each of a database application program, a web server program, an operating system, a custom application program, and a computing platform.

12. The method as set forth in claim 7 wherein creating a system solution behavioral model instance further comprises:
   allowing said user to select less than all of said component instances shown in said design area to define a sub-solution; and
   creating a sub-solution behavioral model instance comprising a collection of fully defined configurable behavioral model instances corresponding to said components of said sub-solution.

13. A computer program product for assembling a computing solution, the computer program product comprising:
   a memory or storage drive having computer usable program code embodied therewith; and
   computer useable program code comprising: computer useable program code configured to display on a portion of a computer display a palette containing a plurality icons representing available computing system components for potential use in a computing solution, each of said available components having an associated configurable behavioral model, each configurable behavioral model being partially defined in a behavioral modeling language, each of said partial definitions having incomplete interface definitions and incomplete behavioral logic;
   computer useable program code configured to associate each of a plurality of templates coupled with implementation logic with one of said configurable behavioral models, each template incorporating user-modifiable parameters and options for an associated configurable behavioral model, said templates being in a markup language format;
   computer useable program code configured to, responsive to selection of one or more of said icons by a user, instantiate one or more partially defined behavioral model instances associated with said selected icons and said partially defined configurable behavioral models;
   computer useable program code configured to place and arrange in a design area on a portion of said computer display one or more icons corresponding to said component partially defined behavioral model instances;
   computer useable program code configured to display on said computer display of said computing platform a user prompt for model interface parameters and model behavioral logic parameters for at least two model instances, said user prompt being automatically displayed responsive to a user creating a connection between two or more displayed icons representing said model instances in said design area;
   computer useable program code configured to receive from said user via said user prompt one or more model interface parameters and model behavioral logic parameters;
   computer useable program code configured to configure said connected model instances using said received model interface parameters and model behavioral logic parameters through modifying said associated markup language templates, thereby changing said partially defined configurable behavioral model instances to fully defined behavioral model instances; and
   computer useable program code configured to create a system solution behavioral model instance in a behavioral modeling language by:
   creating an instance of a system behavioral model in a modeling language comprising a collection of said interconnected and fully defined component behavioral model instances; and
   simulating operation of said system solution by simulating said fully defined behavioral model component instances, interfaces, and connections.

* * * * *